INVENTORS
NEVILLE T. HENKEL
HERMAN W. SCHARER

ATTORNEYS

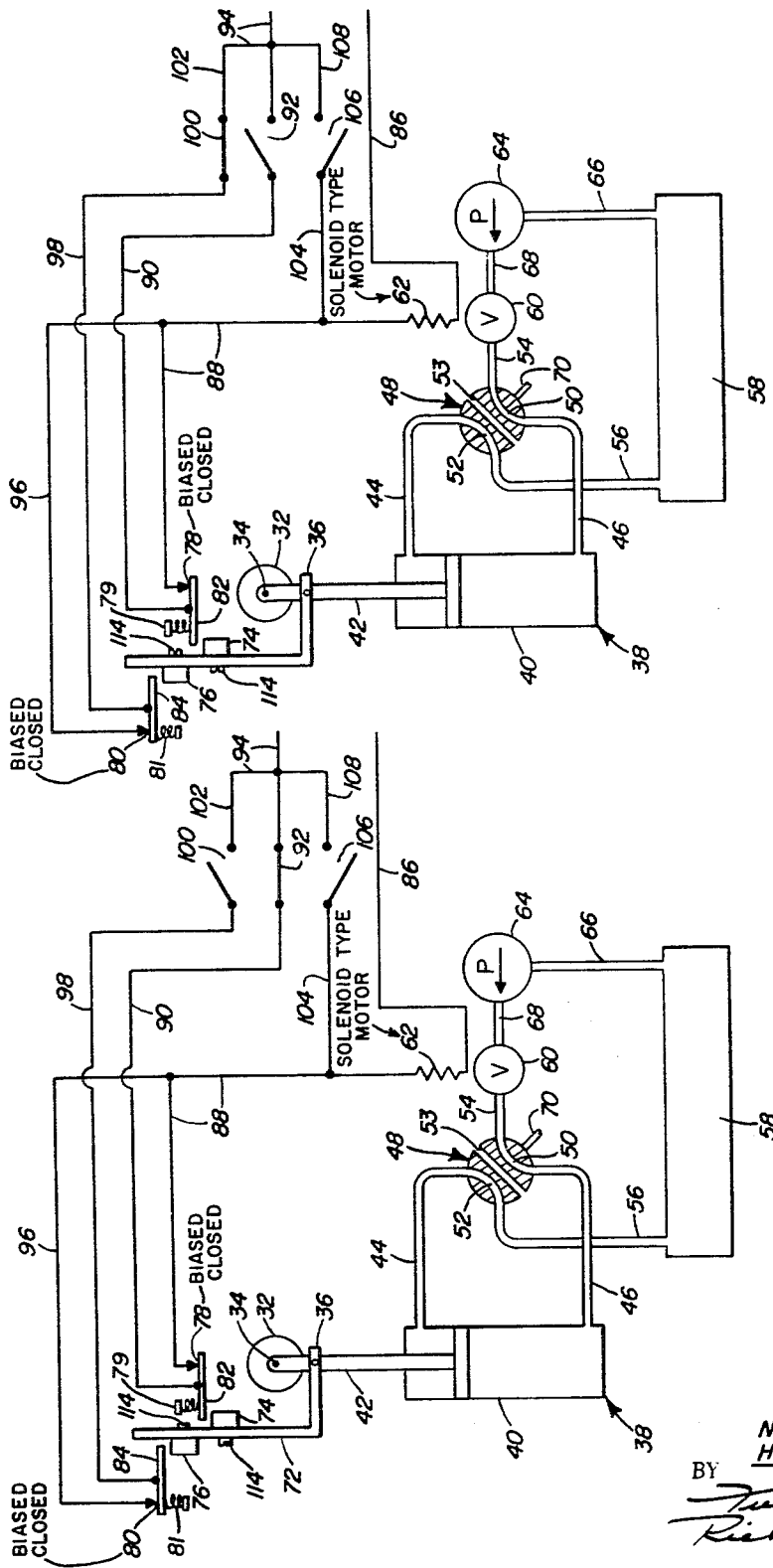

Patented Oct. 21, 1969

3,473,441
CONTROL MECHANISM FOR REVERSIBLE MOTOR
Neville T. Henkel, 9582 Labrador, El Cajon, Calif.
92021, and Herman W. Scharer, Spring Valley,
Calif. 92077; said Scharer assignor to said Henkel
Filed Apr. 25, 1967, Ser. No. 633,623
Int. Cl. F15b *13/16, 13/043*
U.S. Cl. 91—361                                    2 Claims

ABSTRACT OF THE DISCLOSURE

Mechanism for controlling the shifting of an element in two directions, utilizing a reversible motor which when rendered effective for moving the element in one direction, is rendered ineffective after it moves the element a predetermined distance, together with switch mechanism for rendering the motor effective to move the element in the opposite direction.

---

The present invention is directed to utilizing a reversible motor for shifting an element from one position to another and vice versa, limiting the movement of the motor in one direction to a predetermined distance in that direction. Switching means is shiftable to condition the reversible motor for movement in one or the other directions. A controlled electric motor renders the reversible motor operative after the switching means is moved to either of its two positions. After the switching means is moved to one of its two positions, and after the reversible motor becomes effective, a switch in the electric motor circuit becomes effective to limit the movement of the reversible motor in one direction after it moves a predetermined distance in that direction. A circuit is provided for the electric motor for movement in the opposite direction after the switching means is moved to its other position.

Other features and the advantages of the present invention will be apparent from the following description, reference being had to the accompanying drawings wherein a preferred embodiment of the invention is illustrated.

In the drawings:

FIG. 3 is a diagrammatic view of the fluid pressure system and electric system showing one of the two movement limiting circuits effective and the other ineffective; and FIG. 4 is a view similar to FIG. 3, but showing the aforesaid one of the limiting circuits ineffective and the other effective.

Figure 1:
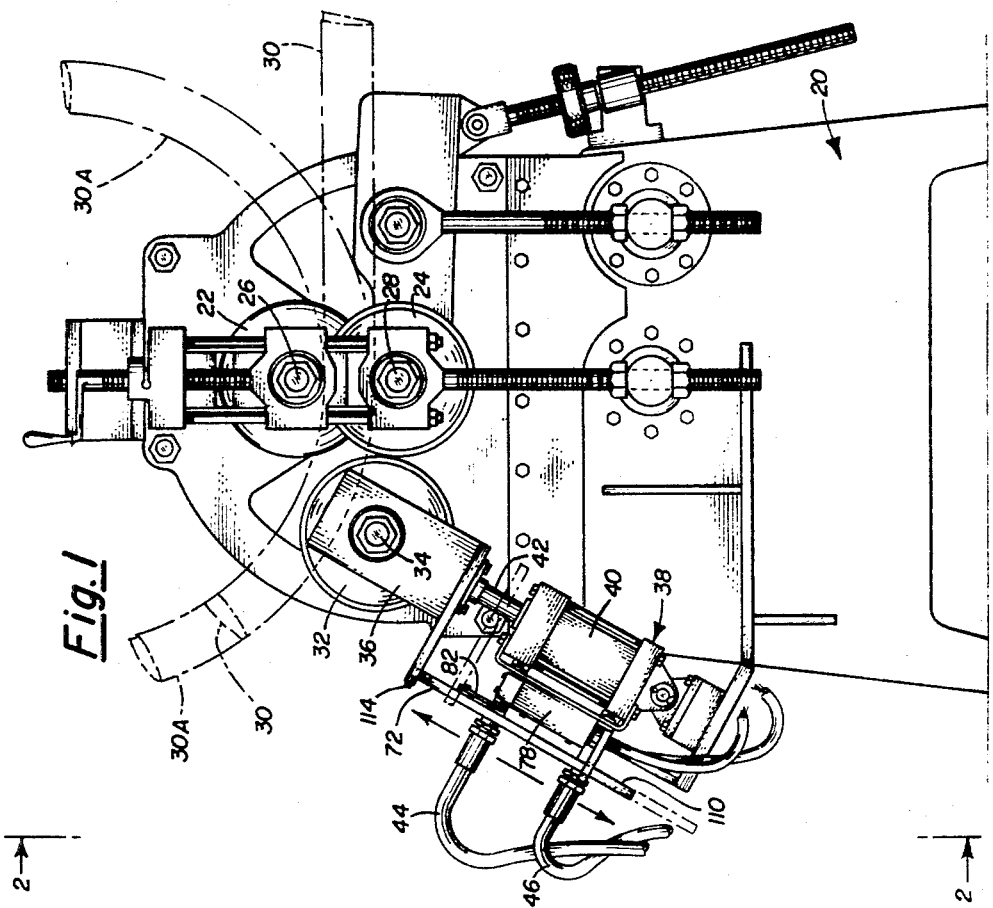
FIG. 1 is a front view of a machine for forming a strip of material into a circular formation.

Referring more in detail to the drawings, the present invention is illustrated as applied to a machine 20 for cold forming a strip of material, such as metal, into a circle. It is provided with two rollers 22 and 24 rotatable with shafts 26 and 28, respectively. The axes of the shafts are parallel, one or both may be rotated by suitable mechanisms. The periphery of the upper roller 22 is curved outwardly radially, and the periphery of the lower roller 24 is in the form of a circular groove, and complement the curved periphery of roller 22. The strip material 30 to be shaped into a circle is fed between the peripheries of the rollers 22 and 24 to effect a further bending state, as shown in dot and dash lines 30A. Further reduction in diameter of the strip 30 is effected by again directing the precurved strip 30A between the peripheries of the two rollers 22 and 24 and against a third roller 32 which is also grooved, but which was not effective during the prior curve forming operation. If necessary, the roller 32 can be raised in steps after completion of a turn of the material through the roller.

The element to be moved in opposite directions is the third roller 32. It is carried by a shaft 34 which in turn is carried by a frame 36. The reversible motor 38 for moving the frame 36 and roller 32 is of the fluid actuated type, preferably a hydraulic motor. This motor includes a cylinder 40, which is fixed stationarily to the machine 20, and a ram 42 which is fixed to the frame 36. As shown more clearly in the diagrammatic views, oil is removed from the top of the cylinder by a pipe 44 and oil is admitted under pressure to the bottom of the cylinder to drive the ram upwardly, and oil is removed from the bottom of the cylinder by pipe 46 and admitted to the top of the cylinder by the pipe 44 to drive the ram downwardly.

The pipes 44 and 46 are connected with a switching means in the form of a valve 48 having three passages 50, 52 and 53. Oil is delivered to the valve from a pipe 54 and is connected also with a pipe 56 leading to a reservoir 58. The flow of oil to pipe 54 is through a valve 60 which is normally biased to a closed position, but which can be opened by an electric motor herein shown as a coil 62 of a solenoid. Oil is withdrawn from the reservoir by a pump 64 through a pipe 66 and forced under pressure by the pump into valve 60 through pipe 68.

As shown in FIGS. 3 and 4, the valve is in a position for conditioning the motor 40 to raise the ram 42 and roller 32. When the valve 48 is turned ninety degrees from the position shown in FIGS. 3 and 4, it is in a position for conditioning the motor to force the ram 42 and roller 32 downwardly. When the valve is in the neutral position, i.e., when passage 53 is aligned with the pipe leading from the valve 60 and pipe 56, the valve can be shifted to any of its three positions manually, as for example, by an arm 70 which is connected with a suitable pedal (not shown). When the valve is connected either with pipe 44 or pipe 46, one being shown, and the coil 62 is energized to open valve 60, then the ram 42 and roller 32 will be moved either up or down depending on the position of valve 48. As shown, when coil 62 is energized, the ram will be raised.

The frame 36 is provided with a fixed, upwardly disposed extension 72 which carries two cams 74 and 76. Two switches 78 and 80, which are normally biased to closed position by springs 79 and 81, are provided with arms 82 and 84 which lie, respectively, in the path of movement of the two cams 74 and 76. An electric circuit includes wire 86, coil 62, wire 88, switch 78, wire 90, manually closeable switch 92 and wire 94. An electric circuit includes wire 86, coil 62, wires 88 and 96, switch 80, wire 98, manually closeable switch 100, and wires 102 and 104. A third circuit includes wire 86, coil 62, wires 88 and 104, manually closeable switch 106, and wires 108 and 94.

When switch 92 is closed, as shown in FIG. 3, and the valve 48 is in the position shown, the coil 62 will be energized, the circuit including the switch 78 and the ram 42 will be moved upwardly. After ram 42 is moved upwardly a predetermined distance, governed by the position of cam 74 with respect to the extension 72 and with respect to the switch arm 82, the cam will engage the switch arm 82 and trip switch 78 open to interrupt the circuit to the coil 62, and it being biased to a closed position will prevent further flow of oil to the cylinder of the hydraulic motor. Thus, the upward extent of movement of roller 32 can be governed.

Then switch 92 is moved manually to its open circuit position. Then after the operator moves valve 48 ninety degrees from that shown, the ram 42, carrying the roller 32, can be shifted downwardly by closing switch 106 to energize coil 62 and open valve 60.

In the event it is desirable to perform a further diameter decrease of the strip 30, then after switch 78 operates to interrupt the circuit through coil 62, switch 92 is manually opened and switch 100 is closed, as shown in FIG. 4, to place the limit of upward movement of the ram 42 and roller 32 under the control of switch 80. The extent of upward movement of the ram and roller depends upon the selected position of the cam 76 with respect to the extension 72 and switch arm 84. When cam 76 trips switch 80 to open position, coil 62 will be deenergized and will close, as previously explained to prevent further upward movement of the ram.

After valve 48 is moved ninety degrees by the operator from the position shown and when switches 92 and 100 are manually opened and switch 106 is manually closed, the coil 62 will be opened whereby the ram is forced downwardly to its lowest position.

Figure 2:
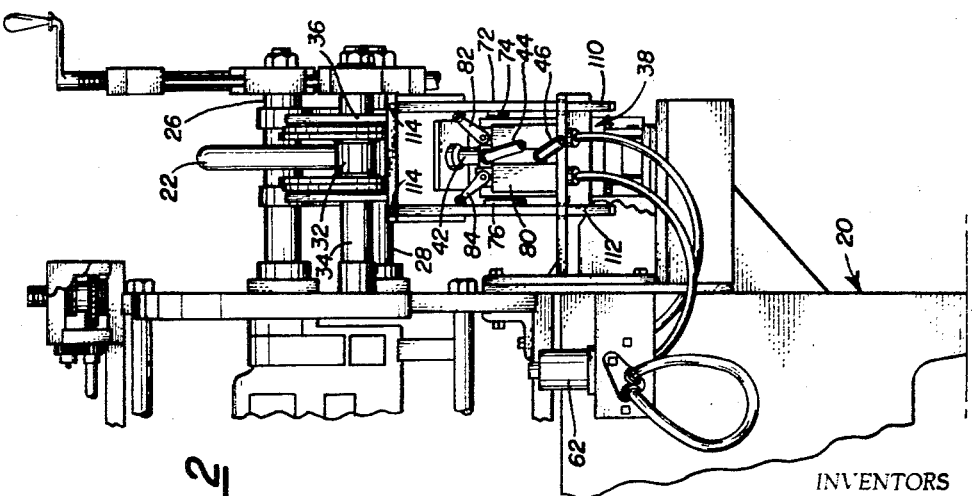
FIG. 2 is a side view of the machine looking in the direction of arrows 2 of FIG. 1.

The cams 74 and 76 are shown in FIG. 2 as being carried by the rods 110 and 112. These rods are removably carried by extension 72. Other rods having cams disposed at different levels may be substituted for those shown, or as shown in FIGS. 3 and 4 the cams may be adjusted to different positions with respect to extension 72 and held in adjusted place by screws 114.

From the foregoing, it can be observed that a simple and inexpensive mechanism has been provided for shifting an element, such as roller 32, to various positions and locked in adjusted position, although subjected to extreme counteracting pressures such as that present in bending steel strips to arcuate shapes.

While the form of embodiment herein shown and described, constitutes preferred form, it is to be understood that other forms may be adopted falling within the scope of the claims that follow.

We claim:

1. Mechanism for controlling the shifting of an element in two directions, comprising in combination:
    (A) a reciprocatable member attached to the element for moving the element in either of two directions;
    (B) a reversible motor for reciprocating the member;
    (C) switching means;
    (D) manual means for shifting the switching means to either of two positions, one in which the reversible motor is conditioned for moving the member in one direction, and one in which the reversible motor is conditioned for moving the member in the opposite direction;
    (E) an electric motor for rendering the reversible motor operative after the switching means is moved to either of said positions;
    (F) an electric circuit including the electric motor, a manually controlled electric switch and a normally closed electric switch for controlling the electric motor;
    (G) means operable by the member, after the switching means is moved to one of its two positions and after the electric circuit is closed by the manually controllable switch to render the reversible motor operative, for opening the normally closed electric switch to render the reversible motor inoperative after it moves the member a predetermined distance in said one direction;
    (H) a circuit including the electric motor, a second manually controlled switch and a normally closed electric switch for maintaining the electric motor operative to continue to move said member in its movement in said one direction although said first mentioned normally closed switch is opened;
    (I) means operable by the member, after the second mentioned circuit is closed, for opening the normally closed switch of the second mentioned circuit after the member is moved in the same direction a predetermined distance beyond the first mentioned predetermined distance;
    (J) a third circuit including the electric motor and a manually controlled switch for rendering the motor operative although both of said first and second mentioned manually controlled switches are open.

2. Mechanism for controlling the shifting of an element in two directions, comprising in combination:
    (A) a reciprocatable member attached to the element for moving the element in either of two directions;
    (B) a reversible motor for reciprocating the member;
    (C) switching means;
    (D) manual means for shifting the switching means to either of two positions, one in which the reversible motor is conditioned for moving the member in one direction, and one in which the reversible motor is conditioned for moving the member in the opposite direction;
    (E) an electric motor for rendering the reversible motor operative after the switching means is moved to either of said positions;
    (F) circuit means including the electric motor and,
        (1) two manually controlled switches, in parallel with one another and each in series with the electric motor;
        (2) means operable by the member, after the switching means is moved to one of its two positions and after one of said two manually controlled switches is closed to render the reversible motor operative, while the other of the two manually controlled switches is open, for opening the circuit means of the electric motor after the member moves a predetermined distance in said one direction;
        (3) means thereafter operated by the member, after said one of said two manually controlled switches is opened and after the other of said two manually controlled switches is closed to render the reversible motor operative, for thereafter opening the circuit means of the electric motor after the member moves a predetermined distance beyond the first predetermined distance;
    (G) and a second circuit including the electric motor and,
        (1) a manually controlled switch for rendering the electric motor operative to move the member in the opposite direction after the switching means is moved to its other position although both of said manually controlled switches are open.

References Cited

UNITED STATES PATENTS

| | | | |
|---|---|---|---|
| 1,051,054 | 1/1913 | Anderson | 91—448 |
| 2,331,108 | 10/1943 | Ganohl. | |
| 2,545,921 | 3/1951 | Goodwillie et al. | 91—410 |
| 2,644,426 | 7/1953 | Moore | 91—448 |
| 2,714,874 | 8/1955 | Hart | 91—448 |
| 3,035,550 | 5/1962 | Hechler et al. | 91—410 |

PAUL E. MASLOUSKY, Primary Examiner

U.S. Cl. X.R.

91—410, 448